(12) United States Patent
Wakasugi et al.

(10) Patent No.: US 7,207,226 B2
(45) Date of Patent: Apr. 24, 2007

(54) SEMICONDUCTOR PRESSURE SENSOR

(75) Inventors: Nobuyoshi Wakasugi, Inazawa (JP);
Minoru Tokuhara, Okazaki (JP); Keiji Horiba, Nishikasugai-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/814,513

(22) Filed: Apr. 1, 2004

(65) Prior Publication Data
US 2004/0194550 A1 Oct. 7, 2004

(30) Foreign Application Priority Data
Apr. 3, 2003 (JP) ............................ 2003-100191

(51) Int. Cl.
*G01L 21/04* (2006.01)
*G01L 7/08* (2006.01)

(52) U.S. Cl. ..................................... 73/753
(58) Field of Classification Search ............ 73/861.47, 73/754, 756, 753
See application file for complete search history.

(56) References Cited
U.S. PATENT DOCUMENTS

| | | | | |
|---|---|---|---|---|
| 4,325,260 A | * | 4/1982 | Takahashi et al. | 73/726 |
| 5,424,249 A | * | 6/1995 | Ishibashi | 438/51 |
| 5,444,286 A | * | 8/1995 | Ichihashi | 257/420 |
| 6,047,604 A | * | 4/2000 | Auburger et al. | 73/756 |
| 6,155,119 A | * | 12/2000 | Normann et al. | 73/756 |
| 6,177,727 B1 | * | 1/2001 | Hart et al. | 257/727 |
| 6,191,359 B1 | * | 2/2001 | Sengupta et al. | 174/52.3 |
| 6,260,417 B1 | * | 7/2001 | Watanabe et al. | 73/754 |
| 6,300,155 B1 | * | 10/2001 | Taki et al. | 438/52 |
| 6,393,922 B1 | * | 5/2002 | Winterer | 73/754 |
| 6,494,088 B2 | | 12/2002 | Albert et al. | |
| 6,590,777 B2 | * | 7/2003 | Morino et al. | 361/736 |
| 2002/0033050 A1 | * | 3/2002 | Shibata et al. | 73/754 |
| 2004/0055387 A1 | * | 3/2004 | Miyazaki et al. | 73/754 |

FOREIGN PATENT DOCUMENTS

| | | |
|---|---|---|
| JP | A-9-119875 | 5/1997 |
| JP | A-9-126927 | 5/1997 |
| JP | 2003049678 | * 2/2003 |

OTHER PUBLICATIONS

Notice of Preliminary Rejection issued from Korean Patent Office issued on Nov. 15, 2005 for the corresponding Korean patent application No. 10-2004-0021858 (a copy and English translation thereof).

* cited by examiner

*Primary Examiner*—Max Noori
(74) *Attorney, Agent, or Firm*—Posz Law Group, PLC

(57) ABSTRACT

In an ECU in which a sensor IC and various engine control devices are mounted on a board in a case, the sensor IC has a pressure sensor element covered with mold resin having a pressure introduction hole extending outward from the pressure sensor element so as to open to an outer surface thereof. A cylindrical resilient member is disposed and resiliently deformed between an inner wall of the case and the outer surface of the mold resin so as to allow a pressure introduction inlet formed in the case to communicate with the pressure introduction hole and not to communicate with places where the engine control devices are mounted. The case of ECU is fixed to a surge tank so that a pressure introduction outlet formed in the surge tank communicates directly with the pressure introduction inlet.

9 Claims, 3 Drawing Sheets

SEMICONDUCTOR PRESSURE SENSOR

CROSS REFERENCE TO RELATED APPLICATIONS

This application is based upon and claims the benefit of priority of Japanese Patent Application No. 2003-100191 filed on Apr. 3, 2003, the content of which is incorporated herein by reference.

BACKGROUND OF THE INVENTION

1. Field of the Invention

The present invention relates to a pressure sensor having a pressure sensor IC mounted on a board, in particular, applicable to an intake system pressure detection device for an internal combustion engine.

2. Description of Related Art

Conventionally, intake pressure of an intake system module for an internal combustion engine has been detected by a pressure sensor as an intake system pressure detection device. A conventional structure for detecting intake pressure is shown in FIG. 5. An intake system module 1 is composed of an air inlet 2, an air cleaner 3, an intake duct 4, a throttle body 5, a surge tank 6, an intake manifold 7 and so on, which are combined with one another and joined together into an integrated body. An intake air passage is formed in the intake system module 1.

The intake system module 1 is mounted on an engine 8. Intake air is supplied to engine 8 through the air inlet 2, the air cleaner 3, the intake duct 4, the throttle body 5, the surge tank 6 and the intake manifold 7.

ECU 9 incorporating various parts and components for engine control (engine control devices) including a sensor IC 13 for detecting intake pressure in the surge tank 6 is installed in an adequate place. An end of a rubber hose 10 is connected to ECU 9 for introducing pressure and the other end of the rubber hose 10 is connected to a connection port 6a formed to communicate with an interior of the surge tank 6. As shown in FIG. 6, the sensor IC 13 is mounted on a board 12 accommodated in a case 11 of ECU 9. The sensor IC 13 has a pressure sensor element (not shown) covered with resin 13a by molding and a pressure introduction pipe 13b protruding outward from an outer surface of the resin 13a.

The case 11 is provided with a hose insertion bore 11a where an axial end of the pressure introduction pipe 13b is positioned. The end of the rubber hose 10 is inserted into the hose insertion bore 11a and connected to the pressure introduction pipe 13b.

However, the conventional structure, in which the rubber hose 10 connects ECU 9 with the surge tank 6 whose interior pressure is detected, has a drawback in that productivity of manufacturing ECU 9 is lower and ECU 9 is manufactured at higher cost. In case of the sensor IC 13 having the pressure introduction pipe 13b protruding outward from an outer surface thereof, it becomes necessary to mount the sensor IC 13 on the board 12 manually or with a special purpose mounting equipment, since a commonly used vacuum type mounting equipment, with which it is very difficult to attract or adhere the sensor IC, can not be used.

Further, the rubber hose 10 is likely worn out or broken due to vibration that may cause a contact between the rubber hose 10 and the case 11 or the vibration transmitted to the sensor IC 13 is likely to cause contact failure between a terminal 13c and a solder 12a. Furthermore, the pressure sensor having the conventional structure is not simple and compact as an intake system pressure detection device, since it requires the rubber hose 10 whose installation takes time and is troublesome.

SUMMARY OF THE INVENTION

An object of the present invention is to provide a pressure sensor which is manufactured with higher productivity and at lower cost.

Another object of the present invention is to provide the pressure sensor applied to an intake system pressure detection device without using the rubber hose.

To achieve the above object, the pressure sensor has a sensor IC, a board, a case and an interposed member. The sensor IC has a pressure sensor element covered with mold resin. The mold resin is provided with a pressure introduction hole extending outward from the pressure sensor element so as to open to a surface thereof. The sensor IC is mounted on the board. The sensor IC and the board are accommodated in the case. The case is provided with a pressure introduction inlet penetrating a wall thereof. The interposed member is provided with a communication hole. The interposed member is disposed between an inner wall of the case and an outer surface of the mold resin so as to allow the pressure introduction inlet to communicate with the pressure introduction hole through the communication hole without air leakage.

Since the sensor IC do not have the pressure introduction pipe protruding outward from the outer surface of the mold resin, the sensor IC can be mounted on the board in use of the commonly used general purpose mounting equipment. Accordingly, the pressure sensor can be manufactured with higher productivity and at lower cost.

The interposed member may be a sealing resin with which an interior of the case is filled except the communication hole so as to encompass the sensor IC and the board. Accordingly, an air tight and water proof construction of the pressure sensor can be achieved.

Further, the interposed member may be a resilient member, for example, an o-ring, whose interior is provided with a through-hole constituting the communication hole and which is resiliently deformed so that both ends of the resilient member are in contact air tightly with the inner wall of the case and the outer surface of the mold resin, respectively. The resilient member, which has a simpler construction, allows communication between the pressure introduction inlet and the pressure introduction hole without air leakage.

The pressure sensor may be applied as an intake system pressure detection device and mounted on an intake system module provided in an interior thereof with an intake air passage through which an intake air is supplied to an engine and in an outer wall thereof with a pressure introduction outlet to which intake pressure in the intake air passage is output. In this case, the pressure sensor is fixed, for example, by screw fastening, to the outer wall of the intake system module in a state that the pressure introduction outlet is opposed to and communicates directly with the pressure introduction inlet without air leakage.

Since the pressure sensor is fixed to the intake system module in a state that the pressure introduction outlet is opposed to and communicates directly with the pressure introduction inlet, it is not necessary for introducing intake pressure into the pressure sensor to use the conventional rubber hose, which results in achieving a simpler and more compact installation structure of the pressure sensor mounted on the intake system module.

It is preferable that the pressure senor is incorporated in ECU for controlling the engine as an integrated body. In this case, engine control devices together with the sensor IC, which are necessary for controlling the engine, are mounted on the board in the case at positions where communication with the pressure introduction inlet is blocked by the interposed member.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
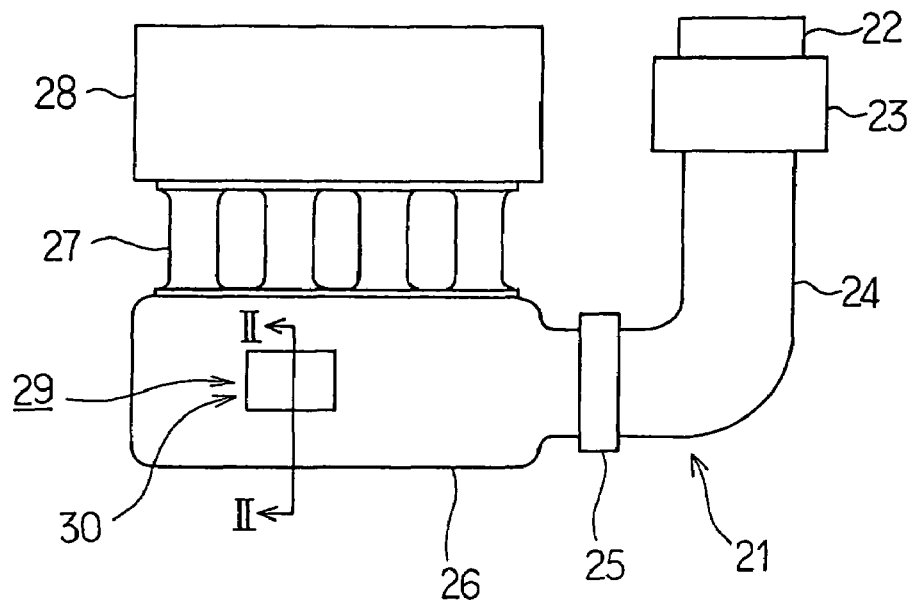
FIG. 1 is a plane view of an intake system module in which a pressure sensor according to a first embodiment of the present invention is applied.
Figure 2:
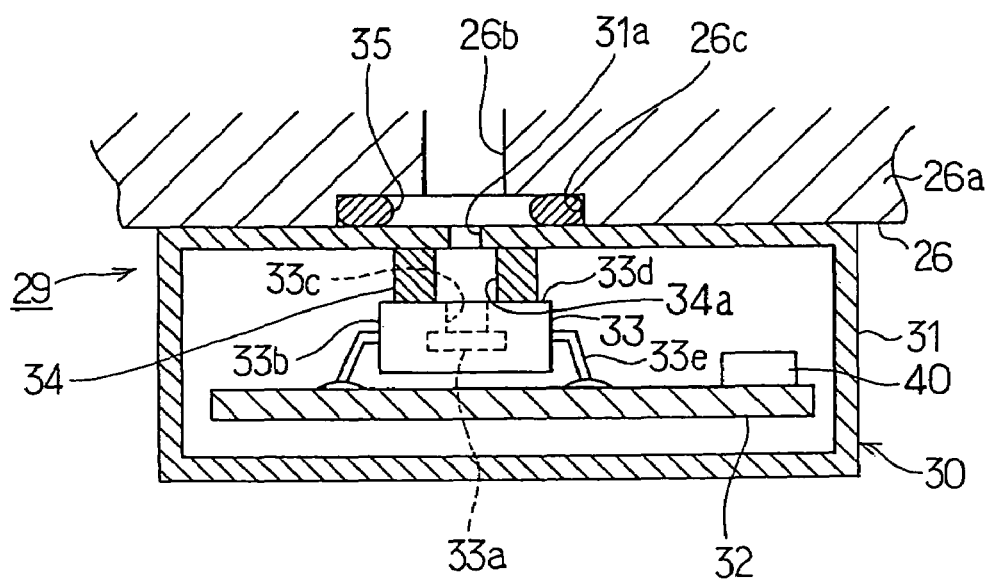
FIG. 2 is a schematic cross sectional view taken along a line II—II of FIG. 1.
Figure 3:
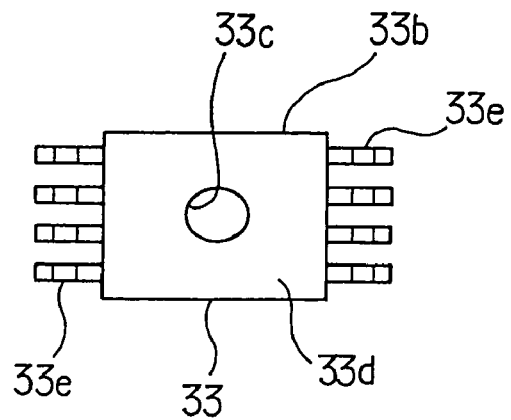
FIG. 3 is a top view of a sensor IC incorporated in the pressure sensor according to the first embodiment.

A first embodiment of the present invention is described with reference to FIG. 1 to 3.

An intake system module 21 is composed of an air inlet 22, an air cleaner 23, an intake duct 24, a throttle body 25, a surge tank 26, an intake manifold 27 and so on, which are combined with one another and joined together into an integrated body. An intake air passage is formed in the intake system module 21.

The intake system module 21 is assembled to an engine 28. Intake air is supplied to the engine 28 through the air inlet 22, the air cleaner 23, the intake duct 24, the throttle body 25, the surge tank 26 and the intake manifold 27.

A pressure sensor 29, an intake system pressure detecting device, is provided for detecting intake pressure in the surge tank 26. The pressure sensor 29 is constructed as a part of ECU 30 in which a sensor IC 33 and various devices for controlling the engine (engine control devices) 40 are incorporated. ECU 30 is fixed via an o-ring 35 to an outer surface of the surge tank 26 in such a manner that a pressure introduction outlet 26b of the surge tank 26 communicates with a pressure introduction inlet 31a formed in ECU 30 without air leakage. As shown in FIG. 2, a board 32 is accommodated in a case 31 of ECU 30. The sensor IC 33 and the engine control devices 40 are mounted on the board 32. The sensor IC 33 has a pressure sensor element 33a covered with mold resin 33b. The mold resin 33b is provided with a pressure introduction hole 33c extending outward from the pressure sensor element 33a so as to open to a surface 33d thereof. The pressure introduction hole 33c does not protrude outward from the surface 33d of the mold resin 33b. The surface 33d is a flat surface. When the sensor IC 33 is mounted on the board 32, the surface 33d can be attracted easily by a general purpose mounting equipment.

After the sensor IC 33 is mounted on the board 32, terminals 33e of the sensor IC 33 are bonded to the board 32 by automatic soldering.

The case 31 is provided at a position opposed to the pressure introduction hole 33c with the pressure introduction inlet 31a. A cylindrical resilient member 34 having a communication hole (through-hole) 34a is disposed between an inner wall of the case 31 and an outer surface 33d of the mold resin 33b so that the pressure introduction inlet 31a communicates with the pressure introduction hole 33c through the communication hole 34a without air leakage.

The resilient member 34 is resiliently deformed so that both ends of the resilient member 34 are in contact air tightly with the inner wall of the case 31 and the outer surface 33d of the mold resin 33b, respectively. To assure the air tightness, the both ends of the resilient member 34 may be glued to the inner wall of the case 31 and the outer surface 33d of the mold resin 33b. The cylindrical resilient member 34 constitutes an interposed member.

The surge tank 26, a subject device whose inner pressure is detected, is provided in an outer wall 26a thereof with the pressure introduction outlet 26b and on an outer surface of the outer wall 26a thereof with a large diameter recess 26c to which an end of the pressure introduction outlet 26b is opened. The o-ring 35 is arranged in the large diameter recess 26c.

The case 31 of ECU 30 is fixed, via the o-ring 35, to the outer wall 26a of the surge tank 26 by fastening means such as gluing or screw fastening in such a manner that the pressure introduction inlet 31a of the case 31 is opposed to the pressure introduction outlet 26b of the surge tank 26. The o-ring 35 serves to protect air leakage between the case 26 of ECU 30 and the outer wall 26a of the surge tank 26.

According to the first embodiment mentioned above, the sensor IC 33 has the pressure sensor element 33a covered with the mold resin 33b and the pressure introduction hole 33c is formed within the mold resin 33b. The sensor IC 33 does not have a projection such as the conventional pressure introduction pipe that protrudes outward from the surface 33d of the mold resin 33b. Accordingly, the sensor IC 33 can be mounted on the board 32 commonly by the general purpose mounting equipment that is used for mounting the engine control devices 40 on the board 32. Further, since the case 31, in which the board 32 and the sensor IC 33 are accommodated, can be fixed directly to the surge tank 26 by gluing or screw fastening, intake pressure in the surge tank 26 can be detected without using the conventional rubber hose for pressure introduction. Accordingly, structure of the pressure sensor 29 as the intake system pressure detection device is simpler and more compact.

Further, according to the first embodiment, the cylindrical resilient member 34, whose construction is simpler, can allow communication between the pressure introduction hole 33c and the pressure introduction inlet without air leakage.

Figure 4:
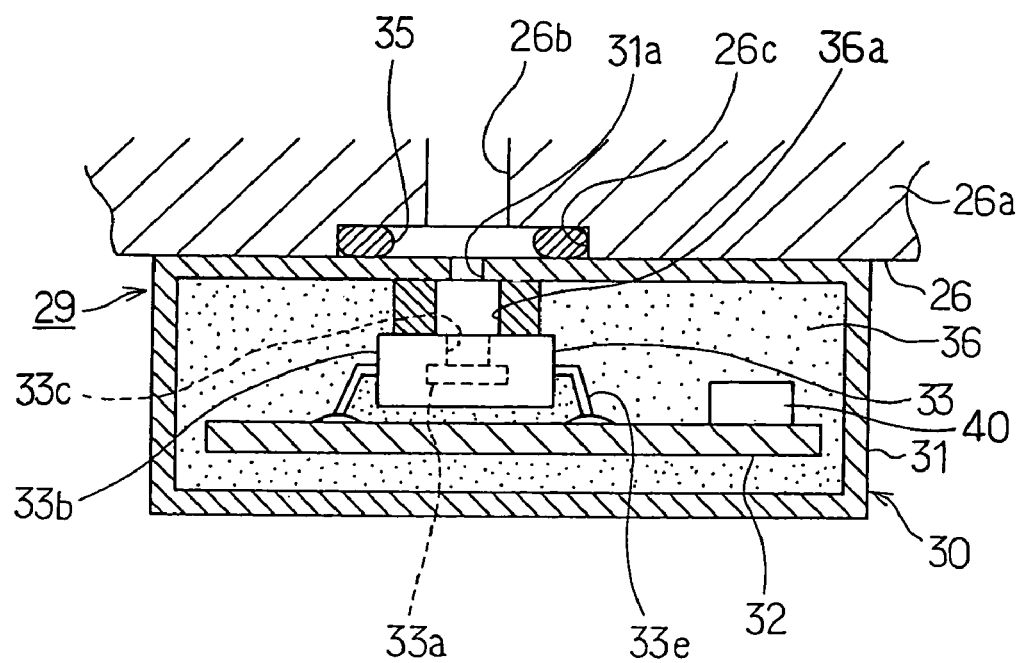
FIG. 4 is a schematic cross sectional view of a pressure sensor according to a second embodiment.
Figure 5:
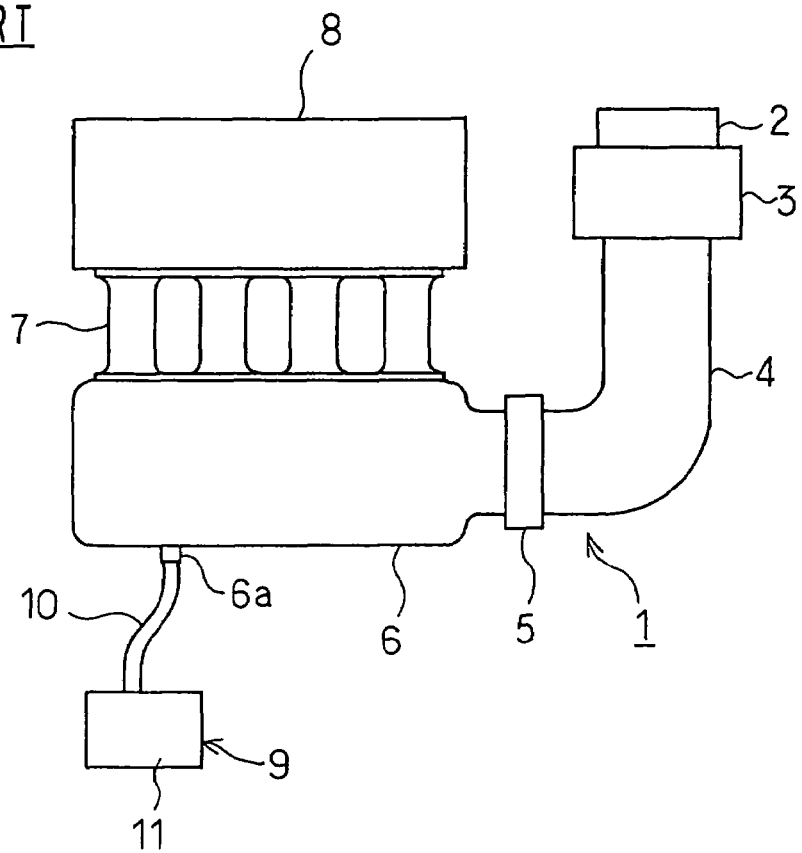
FIG. 5 is a plane view of an intake system module in which a pressure sensor as a prior art is applied.
Figure 6:
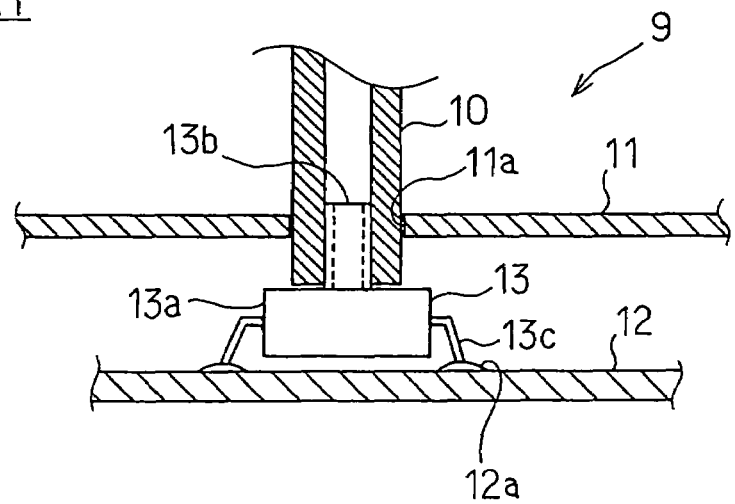
FIG. 6 is a cross sectional view of a part of the pressure sensor as a prior art.

A second embodiment of the present invention is described with reference to FIG. 4.

According to the second embodiment, the interior of the case 31 of ECU 30 is filled with resin 36, as an interposed member. The resin 36 serves to secure an air tight and water proof structure of the pressure sensor 29. To form a communication hole 36a, a cylindrical pipe is placed between the inner wall of the case 31 and the outer surface 33d of the mold resin 33b. However, it is not necessary to assure the communication between the pressure introduction inlet 31a and the pressure introduction hole 33c without air leakage that the cylindrical pipe is resiliently deformed like the resilient member 34 of the first embodiment because the resin 36 comes in contact air tightly with the inner wall of the case 31 and the outer surface 33*d* of the mold resin 33*b*. Further, the cylindrical pipe is not always necessary if the communication hole 36*a* is formed directly by the resin 36, for example, if the communication hole 36*a* is formed by removing or pulling out an insertion jig extending from the pressure introduction inlet 31*a* to the mold resin 33*b* after the interior of the case 30 is filled with the resin 36.

What is claimed is:

1. A pressure sensor to be mounted on an intake system module of an engine, comprising:
    a sensor IC having a pressure sensor element covered with mold resin, the mold resin being provided with a pressure introduction hole extending outward from the pressure sensor element so as to open to an outer surface thereof;
    a board on which the sensor IC is mounted;
    a case in which the sensor IC and the board are accommodated, the case being provided with a pressure introduction inlet penetrating a wall thereof wherein the case is directly attached to an outer wall of the intake system module so that the pressure introduction inlet is opposed to a pressure introduction outlet provided in the outer wall; and
    an interposed member including a resilient member and having a communication hole, the interposed member being entirely disposed between an inner wall of the case and the outer surface of the mold resin so as to allow the pressure introduction inlet to communicate with the pressure introduction hole without air leakage.

2. The pressure sensor according to claim 1, wherein the interposed member is a sealing resin with which an interior of the case is filled except the communication hole so as to encompass the sensor IC and the board.

3. The pressure sensor according to claim 1, wherein the interposed member is resiliently deformed so as to contact air tightly with the inner wall of the case and the outer surface of the mold resin.

4. The pressure sensor according to claim 1, wherein the intake system module is provided in an interior thereof with an intake air passage through which an intake air is supplied to the engine.

5. The pressure sensor according to claim 4, wherein the pressure sensor is incorporated in an ECU for controlling the engine as an integrated body, and the ECU includes:
engine control devices in addition to the sensor IC, which are necessary for controlling the engine, mounted on the board in the case at positions where communication with the pressure introduction inlet is blocked by the interposed member.

6. A pressure sensor to be mounted on an intake system module of an engine, the pressure sensor comprising:
    a sensor IC mounted on a board, the sensor IC having a pressure sensor element covered with a mold resin, the mold resin being provided with a pressure introduction hole extending outward from the pressure sensor element so as to open to an outer surface thereof;
    a case in which the sensor IC and the board are accommodated, the case having a pressure introduction inlet penetrating a wall thereof, the case being directly fixed to an outer wall of the intake system module so that the pressure introduction inlet is opposed to a pressure introduction outlet provided in the outer wall; and
    a resilient member having a communication hole, the resilient member being entirely interposed between and contacting an inner wall of the case and the outer surface of the mold resin so as to allow the pressure introduction inlet to communicate with the pressure introduction hole without air leakage.

7. The pressure sensor according to claim 6, further comprising a sealing resin with which an interior of the case is filled, the sealing resin interposed between the inner wall of the case, the outer surface of the mold resin, and around an outer surface of the resilient member except the communication hole so as to encompass the sensor IC and the board.

8. The pressure sensor according to claim 6, wherein the intake system module includes an intake air passage in an interior thereof, through which an intake air is supplied to the engine.

9. The pressure sensor according to claim 6, wherein:
    the pressure senor is incorporated in an ECU for controlling the engine as an integrated body; and
    the ECU includes an engine control device in addition to the sensor IC, the engine control device controlling the engine, the engine control device mounted on the board in the case at a position where communication with the pressure introduction inlet is blocked by the resilient member.

* * * * *